Patented June 15, 1954

2,681,268

UNITED STATES PATENT OFFICE 2,681,268

PROCESS FOR THE MANUFACTURE OF MANGANESE DIOXIDE AND DEPOLARIZERS FOR ELECTRIC CELLS

Ernest Samuel Nossen, Paterson, N. J.

No Drawing. Application May 7, 1949,
Serial No. 92,079

10 Claims. (Cl. 23—145)

The present invention relates to processes for the manufacture of manganese dioxide from materials containing manganese.

An object of the present invention is to provide a process for the manufacture of manganese dioxide wherein losses of valuable materials are practically eliminated.

A further object of the present invention is to provide an economical and efficient process for the manfacture of manganese dioxide from low grade manganese ore.

Other objects and advantages of the invention will be apparent from the following description.

The process according to the invention is based on the following equations given as examples:

A

1. $2MnO_2 + H_2 = Mn_2O_3 + H_2O$
2. $Mn_2O_3 + 2HNO_3 = \underline{MnO_2.xH_2O} + Mn(NO_3)_2$
3. $Mn(NO_3)_2 \rightarrow MnO_2 + MnO_2 + 2NO_2$
4a. $3NO_2 + H_2O = 2HNO_3 + NO$
4b. $4NO + 3O_2 + 2H_2O = 4HNO_3$ or

B

1. $3MnO_2 + 2H_2 = Mn_3O_4 + 2H_2O$
2. $Mn_3O_4 + 4HNO_3 = \underline{MnO_2.xH_2O} + 2Mn(NO_3)_2$
3. $Mn(NO_3)_2 \rightarrow MnO_2 + 2NO_2$
4a. $3NO_2 + H_2O = 2HNO_3 + NO$
4b. $4NO + 3O_2 + 2H_2O = 4HNO_3$ or

C

1. $MnO_2 + H_2 = MnO + H_2O$
2. $MnO + 2HNO_3 = Mn(NO_3)_2 + H_2O$
3. $Mn(NO_3)_2 \rightarrow MnO_2 + 2NO_2$
4a. $3NO_2 + H_2O = 2HNO_3 + NO$
4b. $4NO + 3O_2 + 2H_2O = 4HNO_3$ or

D

1. $MnCO_3 + 2HNO_3 = Mn(NO_3)_2 + CO_2 + H_2O$
2. $Mn(NO_3)_2 \rightarrow MnO_2 + 2NO_2$
3a. $3NO_2 + H_2O = 2HNO_3 + NO$
3b. $4NO + 3O_2 + 2H_2O = 4HNO_3$ If the starting material is a manganese ore with a content of 85% $MnO_2$, the process may be carried out either according to A or B. Then, by reducing the manganese ore to $Mn_2O_3$ (according to A) or to $Mn_3O_4$ (according to B), treating the reduced ore with $HNO_3$, separating the manganese nitrate solution thus obtained from the insoluble remainder of the material, and decomposing said manganese nitrate solution two products having a $MnO_2$-content are obtained. The first product having a $MnO_2$-content of approximately 70% and containing the oxides of aluminum, silicon, iron, and so on, of the ore is obtained by the reaction according to Equation 2 of A or B; the second product having a $MnO_2$-content of approximately 95% is obtained by the reaction according to Equation 3 of A or B.

If the reactions according to Equations 4a and 4b of A or B take place simultaneously with the evaporation and decomposition of the manganese nitrate solution according to Equation 3 of A or B in the decomposition unit and heat required for said evaporation and decomposition is supplied in the form of heated air passing through the decomposition unit, the nitric acid may be recovered almost completely with the exception of a small amount connected with the oxides of the alkali-metals and alkaline earth-metals extracted from the ore which will be washed out of the manganese dioxide and discarded. When the reactions according to Equations 3 and 4a and 4b take place simultaneously, the manganese dioxide acts as a catalyst in the reaction according to Equation 4b. Thus, the process according to the invention is highly economical, as practically no losses of material occur.

Above mentioned lower manganese oxides $Mn_2O_3$ and $Mn_3O_4$ comprising 2-valent and 4-valent manganese in the same molecule are considered to be manganous salts of manganic acid; therefore they are called manganous manganites.

If the starting material is a manganese ore with a content of less than 80% $MnO_2$ it would be impractical to carry out the process according to A or B as the $MnO_2$ content of the first product obtained by the reaction according to Equation 2 would be too low. In such a case, preferably, the process according to C is carried out and the manganese ore is reduced to MnO at a higher temperature in a reducing atmosphere. MnO is extracted completely by leaching with $HNO_3$ in a few hours, while the iron usually present to a higher degree in low grade manganese ores remains insoluble. The solid remainder of the ore obtained by the leaching thereof is discarded after a thorough washing operation and the manganese nitrate solution is evaporated and decomposed for obtaining $MnO_2$ and recovering $HNO_3$.

If the starting material is a material containing manganese in its bivalent form, the process according to D may be carried out. In such a case the reduction of the starting material to the three-or bivalent Mn becomes unnecessary and the material, for example MnCO₃, is treated immediately with HNO₃ so as to form manganese nitrate solution. Iron or other metals which may be in said solution will be precipitated by neutralizing the acid manganese nitrate solution by CaCO₃ in presence of air. The filtered manganese nitrate solution is evaporated and decomposed for obtaining MnO₂ and recovering HNO₃.

In all of above-mentioned processes according to A, B, C or D the material treated with HNO₃ contains manganese in a form lower than fourvalent.

The processes according to C and D offer very favorable opportunities for the concentration of manganese from low-grade material containing a comparatively small amount of manganese. Such a manganese dioxide concentrate is very suitable for the steel industry, the chemical industry and other purposes.

When the manganese dioxide produced according to any one of above mentioned processes shall be used as a depolarizer in an electric primary cell, it is advisable to convert present free manganic acid groups MnO(OH)₂ into manganites, for example by treating the material with an alkali-hydroxide KOH so as to convert same into MnO(OK)₂ or by treating the material with a salt of manganese in the presence of alkali so as to convert same into

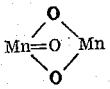

The formation of manganites in this manner or in another suitable manner prevents detrimental effects on the shelf life of batteries.

The process according to the invention will now be described in several examples, but it should be understood that these examples are given by way of illustration rather than by way of limitation and that many variations may be made in the selection of the starting material, the mode of operations, the reducing agents, the temperature, the time of reaction, and so on, without departing from the spirit of the invention.

*Example I*

Manganese ore with a content of 85% MnO₂ is reduced in the presence of a reducing gas at a temperature between 400°–500° C. to Mn₂O₃. The reduced ore is treated with nitric acid at a temperature of 60° C. for a few hours, until the material has been converted to MnO₂·xH₂O and Mn(NO₃)₂ in solution. The suspension is filtered and the solid remainder deposited on the filter is thoroughly washed and dried. Said solid remainder contains 70–75% MnO₂ calculated at dry-weight. The manganese nitrate solution separated from said manganese dioxide by said filtration is concentrated at about 300 gm. Mn(NO₃)₂ per liter and introduced into a spray-drier, which is supplied with heated air. The heated air causes the evaporation of the water and the decomposition of Mn(NO₃)₂ into MnO₂ and NO₂. MnO₂ is deposited in the spray-drier, and nitric acid recovered from the gases is discharged from the spray-drier in gaseous form together with steam at a temperature of approximately 200° C. The conditions for recovering nitric acid from nitric oxides, steam and air, an oxygen containing medium, in the presence of manganese dioxide acting as a catalyst are so favorable, that a quantitative reaction takes place. The heat set free by the condensation of the steam containing the gaseous nitric acid may be used for above mentioned concentration of the manganese nitrate solution before the latter is introduced into the spray-drier.

The nitric acid recovered during the operation may be used for the next batch operation.

*Example II*

Manganese ore having a content of 90% MnO₂ is reduced in presence of a reducing gas at a temperature of about 500° C. to Mn₃O₄. The reduced ore is treated with diluted nitric acid at a temperature of 60° C. for a few hours, until ⅓ of the manganese has been converted into hydrated manganese dioxide and ⅔ of the manganese have been converted into manganese nitrate in solution. The suspension of hydrated manganese dioxide in manganese nitrate solution is filtered for separating the products from each other. The solid product containing 70–75% MnO₂ is treated with a KOH solution for neutralizing free manganic acid groups and forming manganites of manganese and of potassium.

The manganese nitrate solution is concentrated to about 300 gm. Mn(NO₃)₂ per liter, whereupon it is evaporated and decomposed at a temperature between 200° and 300° C. The gases leaving the decomposition unit are led into an oxidizing atmosphere, where the nitric acid is recovered. The manganese dioxide still containing a small amount of Mn(NO₃)₂ is removed from the decomposition unit, whereupon it is treated with a KOH solution to form manganites which are filtered, washed and dried.

*Example III*

A manganese ore with a content of 35% MnO₂ and 4% iron is reduced in a reducing atmosphere provided by an oil at a temperature between 650°–700° C. to MnO. The reduced ore is sufficiently cooled so as to prevent reoxidation. By leaching the material with diluted nitric acid the manganese will be completely extracted within a few hours, while the iron remains insoluble. The manganese nitrate solution thus obtained is filtered and the insoluble remainder deposited on the filter is discarded after a thorough washing thereof.

The manganese nitrate solution is treated in the same manner as described in Example I for obtaining the manganese dioxide and recovering the nitric acid.

The manganese dioxide removed from the decomposition unit may contain some alkali- and alkaline earth nitrates from the ore, which may be washed out by water.

*Example IV*

A natural manganese carbonate (rhodochrosite) is treated with diluted nitric acid, until it is dissolved. The suspension of the unsoluble remainder of the ore in the manganese nitrate solution is neutralized with CaCO₃ in the presence of air whereby dissolved iron and other metals are precipitated.

The manganese nitrate solution is filtered, concentrated and decomposed so as to obtain manganese dioxide and recover nitric acid in the manner described above in Example I.

Although the formation of manganite is described only in Example II, it is understood that the manganese dioxide obtained by the processes described in Examples I, III and IV may be converted into manganites in the same or another suitable manner. Of course, the conversion of manganese dioxide into manganites may be omitted in the process of Example II, if so desired.

It is understood that the term "reducing gas" used in the specification and claims means a gas per se containing carbon monoxide or hydrogen or a gas formed at reaction temperature from materials containing carbon.

What I claim is:

1. A process for the manufacture of manganese dioxide, comprising the steps of: reducing an ore containing manganese in a four-valent form to a manganous maganite by subjecting same to heat at a temperature of approximately 400–650° C. in a reducing gas, producing a first hydrated manganese dioxide and a manganese nitrate solution by treating said reduced manganese ore with nitric acid, separating said manganese dioxide and said manganese nitrate solution from each other, producing a second manganese dioxide product and gaseous products by decomposing said manganese nitrate solution by subjecting same to heat at a temperature of approximately 200–300° C., and recovering nitric acid from said gaseous products by reaction with an oxygen containing medium for re-use by recycling.

2. A process for the manufacture of manganese dioxide, comprising the steps of: reducing an ore containing manganese in a four-valent form to $Mn_2O_3$ by subjecting same to heat at a temperature of approximately 400–650° C. in a reducing gas, producing a first hydrated manganese dioxide and a manganese nitrate solution by treating said reduced manganese ore with nitric acid, separating said manganese dioxide and said manganese nitrate solution from each other, producing a second manganese dioxide product and gaseous products by decomposing said manganese nitrate solution by subjecting same to heat at a temperature of approximately 200–300° C., and recovering nitric acid from said gaseous products by reaction with an oxygen containing medium for re-use by recycling.

3. A process for the manufacture of manganese dioxide, comprising the steps of: reducing an ore containing manganese in a four-valent form to $Mn_3O_4$ by subjecting same to heat at a temperature of approximately 400–650° C. in a reducing gas, producing a first hydrated manganese dioxide and a manganese nitrate solution by treating said reduced manganese ore with nitric acid, separating said manganese dioxide and said manganese nitrate solution from each other, producing a second manganese dioxide product and gaseous products by decomposing said manganese nitrate solution by subjecting same to heat at a temperature of approximately 200–300° C., and recovering nitric acid from said gaseous products by reaction with an oxygen containing medium for re-use by recycling.

4. A process for the manufacture of manganese dioxide, comprising the steps of: reducing an ore containing manganese in a four-valent form to a manganous manganite by subjecting same to heat at a temperature of approximately 400–650° C. in a reducing gas, producing a first hydrated manganese dioxide and a manganese nitrate solution by treating said reduced manganese ore with nitric acid, separating said manganese dioxide and said manganese nitrate solution from each other, producing a second manganese dioxide product and simultaneously therewith a mixture of nitric acid gases and steam by decomposing said manganese nitrate solution by heat at a temperature of approximately 200–300° C. in the presence of an added oxygen containing medium, and condensing said mixture of nitric acid gases and steam to liquid form for re-use.

5. In a process of manufacturing a manganese dioxide depolarizer for electric primary cells wherein a manganese nitrate solution is formed, the steps of producing a manganese dioxide product and simultaneously therewith a mixture of nitric acid gases and steam by decomposing said manganese nitrate solution by heat at a temperature of approximately 200–300° C. in the presence of an added oxygen containing medium, and converting the manganese product obtained by the decomposition into manganites by treating this product with a soluble hydroxide with alkaline effect whereby free manganic acid groups in the manganese dioxide are neutralized.

6. A process for the manufacture of a manganese dioxide depolarizer, comprising the steps of: reducing an ore containing manganese in a four-valent form to a manganous manganite by subjecting same to heat at a temperature of approximately 400–650° C. in a reducing gas, producing a first hydrated manganese dioxide and a manganese nitrate solution by treating said reduced manganese ore with nitric acid, separating said manganese dioxide and said manganese nitrate solution from each other, producing a second manganese dioxide product and gaseous products by decomposing said manganese nitrate solution by subjecting same to heat at a temperature of approximately 200–300° C., recovering nitric acid from said gaseous products by reaction with an oxygen containing medium, and converting the manganese product obtained by the decomposition into manganites by treating this product with a soluble hydroxide with alkaline effect whereby free manganic acid groups in the manganese dioxide are neutralized.

7. A process for the manufacture of a manganese dioxide depolarizer, comprising the steps of: reducing an ore containing manganese in a four-valent form to $Mn_2O_3$ by subjecting same to heat at a temperature of approximately 400–650° C. in a reducing gas, producing a first hydrated manganese dioxide and a manganese nitrate solution by treating said reduced manganese ore with nitric acid, separating said manganese dioxide and said manganese nitrate solution from each other, producing a second manganese dioxide product and gaseous products by decomposing said manganese nitrate solution by subjecting same to heat at a temperature of approximately 200–300° C., recovering nitric acid from said gaseous products by reaction with an oxygen containing medium for re-use by recycling, and converting the manganese product obtained by the decomposition into manganites by treating this product with a soluble hydroxide with alkaline effect whereby free manganic acid groups in the manganese dioxide are neutralized.

8. A process for the manufacture of a manganese dioxide depolarizer, comprising the steps of: reducing an ore containing manganese in a four-valent form to $Mn_3O_4$ by subjecting same to heat at a temperature of approximately 400–650° C. in a reducing gas, producing a first hydrated manganese dioxide and a manganese nitrate solution by treating said reduced manganese ore with nitric acid, separating said manganese dioxide and said manganese nitrate solution from each other, producing a second manganese dioxide product and gaseous products by decomposing said manganese nitrate solution by subjecting same to heat at a temperature of approximately 200–300° C., recovering nitric acid from said gaseous products by reaction with an oxygen containing medium for reuse by recycling, and converting the manganese product obtained by the decomposition into manganites by treating this product with a soluble hydroxide with alkaline effect whereby free manganic acid groups in the manganese dioxide are neutralized.

9. A process for the manufacture of a manganese dioxide depolarizer, comprising the steps of: reducing an ore containing manganese in a fourvalent form to a manganous manganite by subjecting same to heat at a temperature of approximately 400–650° C. in a reducing gas, producing a first hydrated manganese dioxide and a manganese nitrate solution by treating said reduced manganese ore with nitric acid, separating said manganese dioxide and said manganese nitrate solution from each other, producing a second manganese dioxide product and simultaneously therewith a mixture of nitric acid gases and steam by decomposing said manganese nitrate solution by heat at a temperature of approximately 200–300° C. in the presence of an added oxygen containing medium, condensing said mixture of nitric acid gases and steam to liquid form for reuse, and converting the manganese product obtained by the decomposition into manganites by treating this product with a soluble hydroxide with alkaline effect whereby free manganic acid groups in the manganese dioxide are neutralized.

10. In a process for the manufacture of manganese dioxide by thermal decomposition of manganese nitrate obtained by interaction of a manganese compound with nitric acid, the steps of producing manganese dioxide and simultaneously therewith at the same place a mixture of nitric acid gases and steam by decomposing an aqueous solution of manganese nitrate by heat at a temperature of approximately 200–300° C. in the presence of an added oxygen containing medium, and condensing said mixture of nitric acid gases and steam to liquid form for recycling.

References Cited in the file of this patent

UNITED STATES PATENTS

| Number | Name | Date |
|---|---|---|
| 1,287,041 | Kaplan | Dec. 10, 1918 |
| 1,293,461 | Kaplan | Feb. 4, 1919 |
| 1,318,891 | MacMillan | Oct. 14, 1919 |
| 1,761,133 | Laury | June 3, 1930 |
| 2,174,570 | Doran | Oct. 3, 1939 |
| 2,186,929 | Rossetti | Jan. 9, 1940 |
| 2,374,674 | Fox et al. | May 1, 1945 |

FOREIGN PATENTS

| Number | Country | Date |
|---|---|---|
| 292,991 | Great Britain | Jan. 31, 1929 |
| 138,188 | Switzerland | Apr. 16, 1930 |

OTHER REFERENCES

Mellor, "Treatise on Inorganic and Theoretical Chemistry" (1932), vol. 12, page 441.